United States Patent
Shinohara

(10) Patent No.: US 10,054,098 B2
(45) Date of Patent: Aug. 21, 2018

(54) IGNITION TIMING CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Yoshitsugu Shinohara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/642,429

(22) Filed: Jul. 6, 2017

(65) Prior Publication Data

US 2018/0023530 A1    Jan. 25, 2018

(30) Foreign Application Priority Data

Jul. 19, 2016  (JP) .................................. 2016-141706

(51) Int. Cl.
| | | |
|---|---|---|
| *F02P 5/14* | (2006.01) | |
| *F02P 5/15* | (2006.01) | |
| *F02D 19/08* | (2006.01) | |
| *F02M 37/00* | (2006.01) | |

(52) U.S. Cl.
CPC .............. *F02P 5/15* (2013.01); *F02D 19/084* (2013.01); *F02D 19/087* (2013.01); *F02M 37/0064* (2013.01)

(58) Field of Classification Search
CPC .... F02D 19/081; F02D 19/082; F02D 19/084; F02D 19/085; F02D 19/087; F02D 19/088; F02M 37/0064; F02P 5/14; F02P 5/15
See application file for complete search history.

(56) References Cited

U.S. PATENT DOCUMENTS

| | | | | |
|---|---|---|---|---|
| 5,050,555 A | * | 9/1991 | Mitsumoto | ............. F02P 5/045 123/406.31 |
| 5,255,656 A | * | 10/1993 | Rader | .................. G01N 27/221 123/1 A |
| 8,443,783 B2 | * | 5/2013 | Miersch-Wiemers | ............. F02D 19/0628 123/1 A |
| 2004/0182378 A1 | * | 9/2004 | Oshimi | ............... F02D 41/0025 123/685 |

(Continued)

FOREIGN PATENT DOCUMENTS

JP         H03-141845 A     6/1991

*Primary Examiner* — Thomas Moulis
(74) *Attorney, Agent, or Firm* — Oliff PLC

(57) ABSTRACT

An ignition timing control device for an internal combustion engine including: a setting unit configured to set a target ignition timing of the internal combustion engine based on a reference ignition timing and an advance correction amount; a start determination unit configured to determine, based on change in an alcohol concentration, whether or not the fuel injected from a fuel injection valve starts to switch from a first fuel to a second fuel higher in the alcohol concentration than the first fuel; a completion determination unit configured to determine whether or not switching to the second fuel is completed; a restriction unit configured to restrict the advance correction amount during a switching period to the advance correction amount corresponding to the alcohol concentration of the first fuel or lower; and a cancel unit configured to cancel restriction of the advance correction amount after the completion of the switching is determined.

4 Claims, 7 Drawing Sheets

(56) References Cited

U.S. PATENT DOCUMENTS

| | | | | |
|---|---|---|---|---|
| 2008/0156065 | A1* | 7/2008 | Boudaoud | G01N 27/221 73/1.06 |
| 2009/0030588 | A1* | 1/2009 | Yamashita | F02D 41/0025 701/103 |
| 2009/0314071 | A1* | 12/2009 | Mukai | F02D 19/0623 73/114.38 |
| 2009/0314267 | A1* | 12/2009 | Kawai | F02D 41/0002 123/674 |
| 2010/0024789 | A1* | 2/2010 | Lippa | F02D 19/0684 123/672 |
| 2010/0036587 | A1* | 2/2010 | Kato | F02D 19/0628 701/103 |
| 2010/0049425 | A1* | 2/2010 | Tashima | F02D 19/0628 701/109 |
| 2010/0059020 | A1* | 3/2010 | Serai | F02D 41/0025 123/458 |
| 2010/0101548 | A1* | 4/2010 | Ito | F02D 19/12 123/674 |
| 2016/0084172 | A1* | 3/2016 | Ten Broeke | F02D 41/3845 123/468 |
| 2016/0123245 | A1* | 5/2016 | Wakao | F02D 19/084 123/478 |

\* cited by examiner

IGNITION TIMING CONTROL DEVICE FOR INTERNAL COMBUSTION ENGINE

INCORPORATION BY REFERENCE

The disclosure of Japanese Patent Application No. 2016-141706 filed on Jul. 19, 2016 including the specification, drawings and abstract is incorporated herein by reference in its entirety.

BACKGROUND

1. Technical Field

The present disclosure relates to an ignition timing control device for an internal combustion engine.

2. Description of Related Art

An ignition timing control device for an internal combustion engine which can use a fuel containing alcohol is known (for example, refer to Japanese Patent Application Publication No. 3-141845). In such an ignition timing control device, a reference ignition timing is calculated based on the operating state of the internal combustion engine, and an advance correction amount of an ignition timing is calculated mainly based on the concentration of alcohol in the fuel. The advance correction amount is added to the reference ignition timing to obtain a value to be set as a final target ignition timing. As the ignition timing is advanced more, fuel efficiency is more enhanced though knocking becomes more likely to occur. As an alcohol concentration of the fuel is higher, an octane number of the fuel also becomes higher, so that knocking is less likely to occur. Accordingly, the advance correction amount is calculated to be larger as the alcohol concentration is higher. Thus, enhanced fuel efficiency is achieved within the range where knocking resistance can be secured.

SUMMARY

The concentration of alcohol in the fuel is acquired with an alcohol concentration sensor. The alcohol concentration sensor is provided at a position hardly affected by the heat from the internal combustion engine. Specifically, the alcohol concentration sensor is disposed in a portion of a fuel pipe upstream from a delivery pipe that supplies fuel to a fuel injection valve or disposed in a fuel tank. Therefore, the alcohol concentration sensor is disposed away from the fuel injection valve that actually injects the fuel.

Accordingly, when, for example, the fuel used in the internal combustion engine is switched from a first fuel with a low alcohol concentration to a second fuel with a high alcohol concentration by refueling, a following problem may occur. When the second fuel reaches the alcohol concentration sensor, the first fuel still remains in a portion of the fuel pipe downstream from the alcohol concentration sensor and in the delivery pipe. Therefore, the first fuel is injected from the fuel injection valve. In this state, an advance correction amount may be calculated based on a high alcohol concentration of the second fuel acquired with the alcohol concentration sensor. As a consequence, even though the first fuel is injected from the fuel injection valve, a target ignition timing may be set based on the advance correction amount corresponding to the high alcohol concentration of the second fuel, which may deteriorate the knocking resistance.

When the fuel is switched from the first fuel with a higher alcohol concentration to a third fuel with a lower alcohol concentration, the knocking resistance may deteriorate because of the following reason. The first fuel still remaining in the vicinity of the alcohol concentration may be mixed with the third fuel due to vibration from the internal combustion engine or the like. As a consequence, the alcohol concentration acquired with the alcohol concentration sensor may become higher than the low alcohol concentration of the third fuel. Also in the vicinity of the fuel injection valve, the first fuel may be mixed with the third fuel, so that the concentration of alcohol in the fuel injected from the fuel injection valve may be lower than the alcohol concentration acquired with the alcohol concentration sensor. In this case, if the target ignition timing is set based on the advance correction amount corresponding to the alcohol concentration acquired with the alcohol concentration sensor, the alcohol concentration of the fuel to be injected may become lower than the alcohol concentration acquired with the alcohol concentration sensor, which may result in deterioration in the knocking resistance.

In both the case of switching from the first fuel with a high alcohol concentration to the third fuel with a low alcohol concentration and the case of switching from the first fuel with a low alcohol concentration to the third fuel with a high alcohol concentration, it is desirable for achieving enhanced fuel efficiency and securing the knocking resistance to set the target ignition timing based on an advance correction amount corresponding to the alcohol concentration of the third fuel immediately after the first fuel is completely consumed by fuel injection.

Accordingly, the present disclosure provides an ignition timing control device for an internal combustion engine that achieves enhanced fuel efficiency while securing knocking resistance even when a fuel is switched to another fuel different in alcohol concentration.

An ignition timing control device for an internal combustion engine in a first embodiment, the internal combustion engine being configured to use a fuel containing alcohol, the ignition timing control device including: an operating state acquisition unit configured to acquire an operating state of the internal combustion engine; an alcohol concentration acquisition unit configured to acquire a concentration of alcohol in the fuel based on an alcohol concentration sensor provided to one of a fuel pipe or a fuel tank, the fuel pipe being configured to communicate with a delivery pipe that supplies the fuel to fuel injection valve of the internal combustion engine; a reference ignition timing calculation unit configured to calculate a reference ignition timing of the internal combustion engine based on the operating state; an advance correction amount calculation unit configured to calculate an advance correction amount of an ignition timing such that an advance amount of the ignition timing increases more as the alcohol concentration is higher; a setting unit configured to set a target ignition timing of the internal combustion engine based on the reference ignition timing and the advance correction amount; a start determination unit configured to determine, based on change in the alcohol concentration, whether or not the fuel injected from the fuel injection valve starts to switch from a first fuel to a second fuel higher in the alcohol concentration than the first fuel; a completion determination unit configured to determine whether or not the first fuel remaining in the fuel pipe and the delivery pipe is consumed and switching from the first fuel to the second fuel is completed; a restriction unit configured to restrict the advance correction amount, during a switching period from the time when the start of the switching is determined to the time when the completion of the switching is determined, to an advance correction amount corresponding to the alcohol concentration of the first fuel or lower; and a cancel unit configured to cancel restriction of the advance correction amount after the completion of the switching is determined.

The advance correction amount during the switching period is restricted to an advance correction amount corresponding to the alcohol concentration of the first fuel low in the alcohol concentration or lower. Accordingly, knocking resistance can be secured. After the completion of the switching, restriction of the advance correction amount can be canceled, and the target ignition timing is set based on the advance correction amount corresponding to the alcohol concentration of the second fuel. As a result, it becomes possible to achieve enhanced fuel efficiency while securing the knocking resistance.

An ignition timing control device for an internal combustion engine configured to use a fuel containing alcohol in a second embodiment can be achieved by an ignition timing control device for an internal combustion engine including: an operating state acquisition unit configured to acquire an operating state of the internal combustion engine; an alcohol concentration acquisition unit configured to acquire a concentration of alcohol in the fuel based on an alcohol concentration sensor provided to one of a fuel pipe or a fuel tank, the fuel pipe being configured to communicate with a delivery pipe that supplies the fuel to a fuel injection valve of the internal combustion engine; a reference ignition timing calculation unit configured to calculate a reference ignition timing of the internal combustion engine based on the operating state; an advance correction amount calculation unit configured to calculate an advance correction amount of an ignition timing such that an advance amount of the ignition timing increases more as the alcohol concentration is higher; a setting unit configured to set a target ignition timing of the internal combustion engine based on the reference ignition timing and the advance correction amount; a start determination unit configured to determine, based on change in the alcohol concentration, whether or not the fuel injected from the fuel injection valve starts to switch from a first fuel to a third fuel that is lower in the alcohol concentration than the first fuel; a completion determination unit configured to determine whether or not the first fuel remaining in the fuel pipe and the delivery pipe is consumed and switching to the third fuel is completed; a restriction unit configured to restrict the advance correction amount, during a switching period from the time when the start of the switching is determined to the time when the completion of the switching is determined, to an advance correction amount in the case of the alcohol concentration being zero; and a cancel unit configured to cancel restriction of the advance correction amount after the completion of the switching is determined.

The advance correction amount during the switching period is restricted to the advance correction amount in the case of the alcohol concentration being zero. Accordingly, the knocking resistance can be secured even when the injected fuel has an alcohol concentration lower than the alcohol concentration acquired with the alcohol concentration sensor during the period of switching to the third fuel that is lower in alcohol concentration than the first fuel. After the completion of the switching, restriction of the advance correction amount can be canceled, and the target ignition timing is set based on the advance correction amount corresponding to the alcohol concentration of the third fuel. As a result, it becomes possible to achieve enhanced fuel efficiency while securing the knocking resistance.

The completion determination unit may adopt a configuration in which whether or not switching to the second fuel or the third fuel is completed is determined based on a content volume of a portion of the fuel pipe downstream from the alcohol concentration sensor and the delivery pipe and on an integrated value of the fuel injection amount of the fuel injection valve after the start of the switching is determined.

At the start of switching, the first fuel remains in the fuel pipe downstream from the alcohol concentration sensor and in the delivery piper. Therefore, the content volume of a portion of the fuel pipe downstream from the alcohol concentration sensor and the delivery piper is substantially identical to a residual volume of the first fuel at the start of switching. The integrated value of the fuel injection amount after the start of switching signifies a consumption amount of the remaining first fuel consumed by fuel injection. Accordingly, the completion of the switching is determined based on the residual volume and the consumption amount of the first fuel, so that the completion of switching can be determined with sufficient accuracy. Restriction of the advance correction amount is cancelled after the completion of switching is determined with sufficient accuracy as described above. As a result, it becomes possible to set the target ignition timing based on the advance correction amount corresponding to the alcohol concentration of the second fuel or the third fuel. This makes it possible to achieve enhanced fuel efficiency while securing the knocking resistance.

According to the first and second embodiments, it becomes possible to provide an ignition timing control device for an internal combustion engine that achieves enhanced fuel efficiency while securing the knocking resistance even when a fuel is switched to another fuel different in alcohol concentration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
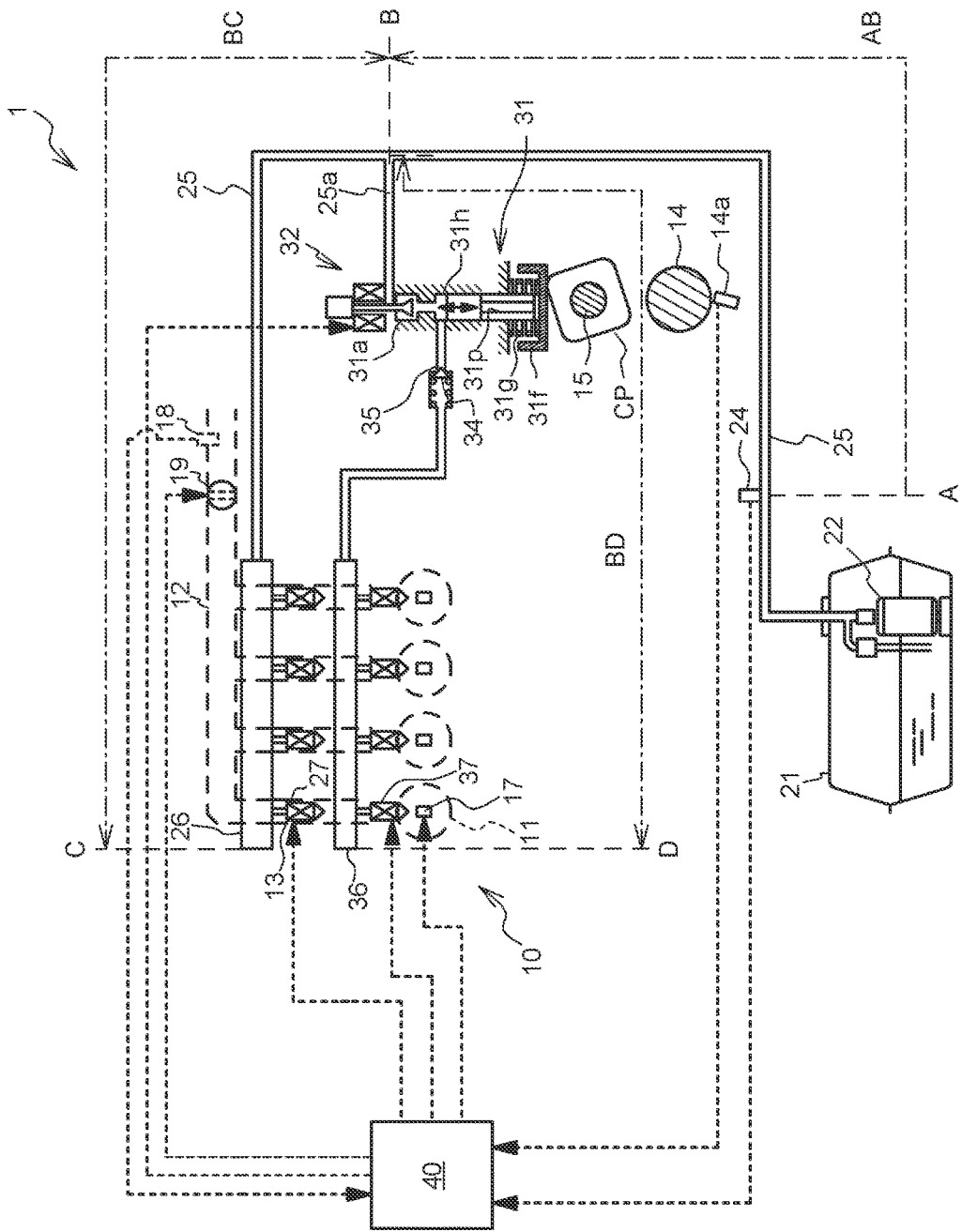
FIG. 1 is a schematic configuration view of an engine system of an embodiment.

FIG. 1 is a schematic configuration view of an engine system 1 of the present embodiments. The engine system 1 includes an electronic control unit (ECU) 40 and the like configured to control ignition timing of an engine 10. The engine 10 is a spark ignition-type in-series 4-cylinder engine including cylinders 11, ignition plugs 17, port injection valves 27, and cylinder injection valves 37. The engine 10 is one example of an internal combustion engine that can use gasoline containing alcohol as a fuel. The ECU 40 is one example of an ignition timing control device for such an internal combustion engine.

The cylinder injection valves 37 and the port injection valves 27 inject fuel into the cylinders 11 and the intake ports 13, respectively. The cylinder injection valves 37 and the port injection valves 27 are electromagnetic drive-type on-off valves that regulate a fuel injection amount depending on an energization period. The ignition plugs 17 perform spark ignition of fuel-air mixture in a combustion chamber when a high voltage is applied to the ignition plugs 17 for spark discharge in response to a command from the ECU 40.

In the engine 10, an intake passage 12 communicating with the intake ports 13 and an exhaust passage communicating with a plurality of exhaust ports which are not unillustrated. In the intake passage 12, an air flowmeter 18 and a throttle valve 19 are disposed in a direction from an upstream side to a downstream side. An opening of the throttle valve 19 is controlled by the ECU 40 based on an accelerator pedal opening indicative of an operation amount of an accelerator pedal, so that the amount of intake air passing through the intake passage 12 is controlled to be a desired value. The air flowmeter 18 outputs to the ECU 40 a detection signal corresponding to the amount of intake air passing through the intake passage 12. Based on the intake air amount, the ECU 40 acquires a load of the engine 10.

Each of the cylinders 11 stores a piston so that the combustion chamber is defined. The combustion chamber is opened and closed with an intake valve and an exhaust valve. The plurality of pistons are driven by a crankshaft 14. The intake valve or the exhaust valve are driven by a cam shaft 15 interlocked with the crankshaft 14. In the vicinity of the crankshaft 14, a crank angle sensor 14a is provided. The crank angle sensor 14a outputs to the ECU 40 a detection signal corresponding to a rotation angle of the crankshaft 14, and the ECU 40 thereby acquires a speed of the engine 10.

The fuel tank 21 stores a fuel that contains alcohol at a given ratio. The fuel tank 21 has a low-pressure pump 22 disposed therein to pressurize and thereby discharge the fuel into a low-pressure pipe 25. A downstream side of the low-pressure pipe 25 communicates with a low-pressure delivery pipe 26 which supplies the fuel supplied from the low-pressure pipe 25 to the port injection valves 27. A branch pipe 25a branching from the low-pressure pipe 25 is connected to a high-pressure pump 31. A downstream side of the high-pressure pump 31 is connected to a high-pressure pipe 35. A downstream portion of the high-pressure pipe 35 communicates with a high-pressure delivery pipe 36 which supplies to the cylinder injection valves 37 a high-pressure fuel supplied from the high-pressure pipe 35. Therefore, the low-pressure pipe 25, the branch pipe 25a, and the high-pressure pipe 35 are examples of the fuel pipe communicating with the low-pressure delivery pipe 26 and the high-pressure delivery pipe 36 which supply fuel to the port injection valves 27 and the cylinder injection valves 37 of the engine 10. The high-pressure pipe 35 is equipped with a check valve 34.

On the upstream side of the low-pressure pipe 25, an alcohol concentration sensor 24 is disposed to detect the concentration of alcohol in the fuel that passes through the low-pressure pipe 25. The alcohol concentration sensor 24 outputs to the ECU 40 a detection signal corresponding to the concentration of alcohol in the fuel. As a result, the ECU 40 acquires the concentration of alcohol in the fuel. The alcohol concentration sensor 24 is of a capacitance type that detects the concentration of alcohol in the fuel by detecting a difference in specific inductive capacity. However, the alcohol concentration sensor 24 is not limited thereto. The alcohol concentration sensor 24 is disposed outside an engine compartment so as to avoid the influence of heat from the engine 10.

In the high-pressure pump 31, a compressing chamber 31a is defined by the plunger 31p sliding inside a pump housing 31h, which increases and decreases the capacity of the compressing chamber 31a. The plunger 31p interlocks with a follower lifter 31f biased by a spring 31g toward the side of a cam CP mounted on a cam shaft 15. The cam shaft 15 interlocks with the crankshaft 14 through a chain. The ECU 40 controls a solenoid valve 32 provided in an inlet portion of the compressing chamber 31a. When energized, the solenoid valve 32 disconnects the branch pipe 25a and the compressing chamber 31a. In a non-energized state, the solenoid valve 32 provides communication between the branch pipe 25a and the compressing chamber 31a.

In the high-pressure pump 31, the fuel is pressurized to a high pressure and is discharged to the high-pressure pipe 35 as described below. When the solenoid valve 32 is in an opened state, the capacity of the compressing chamber 31a increases. As a result, the compressing chamber 31a is filled with the fuel from the branch pipe 25a. Next, the solenoid valve 32 is put in a closed state, so that the capacity of the compressing chamber 31a decreases. As a result, the fuel is pressurized in the compressing chamber 31a. Next, when force of the fuel pressure in the compressing chamber 31a becomes larger than a sum of urging force of the spring of the check valve 34 and fuel-pressure force in the high-pressure pipe 35 while the solenoid valve 32 is in the closed state, the check valve 34 opens. As a result, the pressurized fuel is supplied to the high-pressure pipe 35 and to the high-pressure delivery pipe 36.

The ECU 40 includes a central processing unit (CPU), a read only memory (ROM), and a random access memory (RAM). The ECU 40 executes later-described ignition timing control in accordance with a control program prestored in the ROM based on information such as information from sensors and information prestored in the ROM. The control is executed by an operating state acquisition unit, an alcohol concentration acquisition unit, a reference ignition timing calculation unit, an advance correction amount calculation unit, a setting unit, a start determination unit, a completion determination unit, a restriction unit, and a cancel unit which are functionally implemented by the CPU, the ROM, and the RAM. The details of the control will be described later.

The ECU 40 switches the injection valves used for fuel injection based on the operating state of the engine 10. For example, the fuel is injected only from the port injection valve 27 when the engine 10 is in a low-load and low-speed state. The fuel is injected from both the port injection valve 27 and the cylinder injection valve 37 when the engine 10 is in a low-load and middle-speed state. The fuel is injected only from the cylinder injection valve 37 when the fuel is in a high-load and high-speed state. The ROM of the ECU 40 stores such a map that prescribes the fuel injection amounts of both the port injection valve 27 and the cylinder injection valve 37 in accordance with the operating state of the engine 10.

The ECU 40 sets a target ignition timing which is an ignition timing to ignite the fuel-air mixture, and controls a voltage applied to the ignition plug 17 so that the fuel-air mixture is ignited at the target ignition timing. The target ignition timing is a value obtained by adding an advance correction amount to a reference ignition timing. The reference ignition timing is calculated by the ECU 40, in a viewpoint of securing the output of the engine 10, so as to obtain an ignition timing that can provide a maximum output of the internal combustion engine (so called a minimum advance for best torque (MBT)) based on the operating state of the engine 10, that is, based on the load and speed of the engine 10 to be specific. Both the advance correction amount and the reference ignition timing are calculated with a crank angle.

Figure 2:
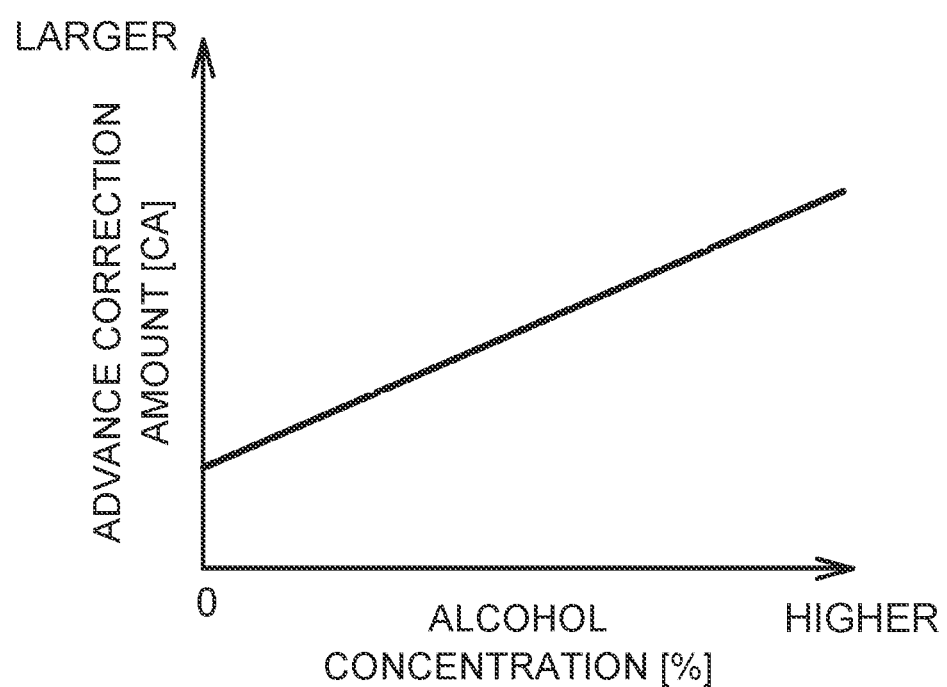
FIG. 2 is one example of a map that prescribes an advance correction amount corresponding to the concentration of alcohol in fuel.

FIG. 2 is one example of a map prestored in the ROM of the ECU 40, the map prescribing the advance correction amount corresponding to the concentration of alcohol in fuel. The advance correction amount is a correction amount for correcting the target ignition timing to an advance side so as to maximize the fuel efficiency within the range where knocking does not occur. Here, as the ignition timing is advanced more, the fuel efficiency is enhanced more, though the knocking resistance is deteriorated. Moreover, as the alcohol concentration in the fuel is higher, an octane number of the fuel becomes higher, so that the knocking resistance becomes more sufficient. Accordingly, as illustrated in the map of FIG. 2, the advance correction amount is calculated to be larger as the alcohol concentration is higher. That is, as the alcohol concentration is higher, a more advanced target ignition timing is set, so that enhanced fuel efficiency is achieved while the knocking resistance is secured. The concentration of alcohol in the fuel is acquired with the alcohol concentration sensor 24. The advance correction amount may be calculated in consideration of not only the alcohol concentration but also other conditions, such as the temperature of cooling water of the engine 10. However, since the ignition timing control described in this embodiment involves only the alcohol concentration, other conditions are assumed to be constant. The ECU 40 may calculate the advance correction amount not based on a map as illustrated in FIG. 2 but by a calculation expression.

Here, when the fuel injected from the port injection valves 27 and the cylinder injection valve 37 switches from the first fuel to the second fuel that is different in alcohol concentration from the first fuel due to refueling or the like, the ECU 40 executes the ignition timing control that achieves enhanced fuel efficiency while securing the knocking resistance. In the ignition timing control, the advance correction amount during a switching period from the start to completion of switching from the first fuel to the second fuel is restricted so as to suppress deterioration of the knocking resistance. Furthermore, the time of completion of the switching to the second fuel is determined with sufficient accuracy, so that enhanced fuel efficiency is achieved while the knocking resistance is secured.

First, a description is given of determination of the start of switching. When a new second fuel is supplied to the fuel tank 21 due to refueling, and the second fuel is pumped up to the alcohol concentration sensor 24 by the low-pressure pump 22, the alcohol concentration that the ECU 40 acquires based on the alcohol concentration sensor 24 changes. When the change amount of the alcohol concentration is equal to or more than a predetermined value, the ECU 40 determines that switching from the first fuel to the second fuel is started.

A description is now given of determination of the completion of switching. The completion of switching is determined based on an integrated value of the fuel injection amounts of the port injection valves 27 and the cylinder injection valves 37 after the start of switching is determined, and based on content volumes $\alpha$, $\beta$, and $\gamma$ in each route of a section AB, a section BC, and a section BD that are piping routes for carrying the pumped-out fuel.

As described in the foregoing, the fuel injection amounts of the port injection valves 27 and the cylinder injection valves 37 are each prescribed in accordance with the operating state of the engine 10. Accordingly, the integrated value of the fuel injection amounts is calculable by adding the fuel injection amounts of the port injection valves 27 and the cylinder injection valves 37 in order after the start of switching is determined.

As illustrated in FIG. 1, the section AB extends from a sensor point A where the alcohol concentration sensor 24 is disposed on the low-pressure pipe 25 to a branch point B where the branch pipe 25a branched from the low-pressure pipe 25. The section BC extends from the branch point B to a downstream end point C of the low-pressure delivery pipe 26. The section BD extends from the branch point B to a downstream end point D of the high-pressure delivery pipe 36. The content volume $\alpha$ is a content volume of the low-pressure pipe 25 in the section AB. The content volume $\beta$ is a sum of the content volumes of the low-pressure pipe 25 and the low-pressure delivery pipe 26 in the section BC. The content volume $\gamma$ is a sum of the content volumes of the branch pipe 25a, the compressing chamber 31a of the high-pressure pump 31, the high-pressure pipe 35, and the high-pressure delivery pipe 36 in the section BD. Since the content volume of the compressing chamber 31a changes with ascent and descent of the plunger 31p, a mean value of the content volume of the compressing chamber 31a is used, for example. The content volumes $\alpha$, $\beta$, and $\gamma$ are acquired by an experiment in advance, and are stored in the ROM of the ECU 40.

When it is determined that the switching is started, the first fuel remains in the sections AB, BC, and BD. The residual volume is substantially equal to the total value of the content volumes $\alpha$, $\beta$, and $\gamma$. The integrated value of the fuel injection amounts of the port injection valves 27 and the cylinder injection valves 37 after the start of switching is substantially equal to the consumption amount of the remaining first fuel consumed by fuel injection. Therefore, it can be presumed that the first fuel remaining in the routes are completely consumed and thereby the switching is completed at the time when the total value of the content volumes $\alpha$, $\beta$, and $\gamma$ coincides with the consumption amount of the remaining first fuel.

Although the first fuel remaining in the section AB is consumed by both the port injection valves 27 and the cylinder injection valves 37, the first fuel remaining in the section BC is hardly consumed by the cylinder injection valves 37, but is consumed by the port injection valves 27. The first fuel remaining in the section BD is also hardly consumed by the port injection valves 27 but is consumed by the cylinder injection valves 37. Accordingly, when following conditions are satisfied, it is determined that the switching is completed. A first condition is that the integrated value of the fuel injection amounts of the port injection valves 27 and the cylinder injection valves 37 after the start of switching is determined becomes equal to or more than the content volume α. A second condition is that the integrated value of the fuel injection amount of the port injection valves 27 after the first condition is satisfied becomes equal to or more than the content volume β. A third condition is that the integrated value of the fuel injection amount of the cylinder injection valves 37 after the first condition is satisfied becomes equal to or more than the content volume γ. When the first, second and third conditions are satisfied, it is determined that the switching is completed.

There may be a case where it is determined that switching to the second fuel is started while fuel injection is performed only from the port injection valves 27, depending on the operating state of the engine 10 as described before. In this case, as long as the cylinder injection valves 37 stop, the first fuel remains in the section BD. Even in this case, the completion of switching is determined when the aforementioned first, second and third conditions are satisfied as the operating state of the engine 10 is switched and injection from the cylinder injection valves 37 is started after the start of the switching is determined. That is, even in such a case, when the first fuel remaining in the sections AB, BC, and BD is completely consumed, the completion of the switching is determined.

This also applies to the case where the start of the switching is determined while fuel injection is performed only from the cylinder injection valves 37. In this case, as long as the port injection valves 27 stop, the first fuel remains in the section BC. Even in this case, the completion of switching is determined when the aforementioned first, second and third conditions are satisfied as the operating state of the engine 10 is switched and injection from the port injection valves 27 is started after the start of the switching is determined.

In the case where fuel injection is performed only from one of the port injection valves 27 and the cylinder injection valves 37 when the start of the switching is determined as described before, the ECU 40 may temporarily switch a normal injection map, which prescribes each fuel injection amount of the port injection valves 27 and the cylinder injection valves 37 in normal operation, to a transient injection map for an enlarged operating range in which fuel injection is performed from both the port injection valves 27 and the cylinder injection valves 37. As a result, the first fuel can be consumed by both the port injection valves 27 and the cylinder injection valves 37, so that the switching to the second fuel can be completed at an early stage.

Figure 3:
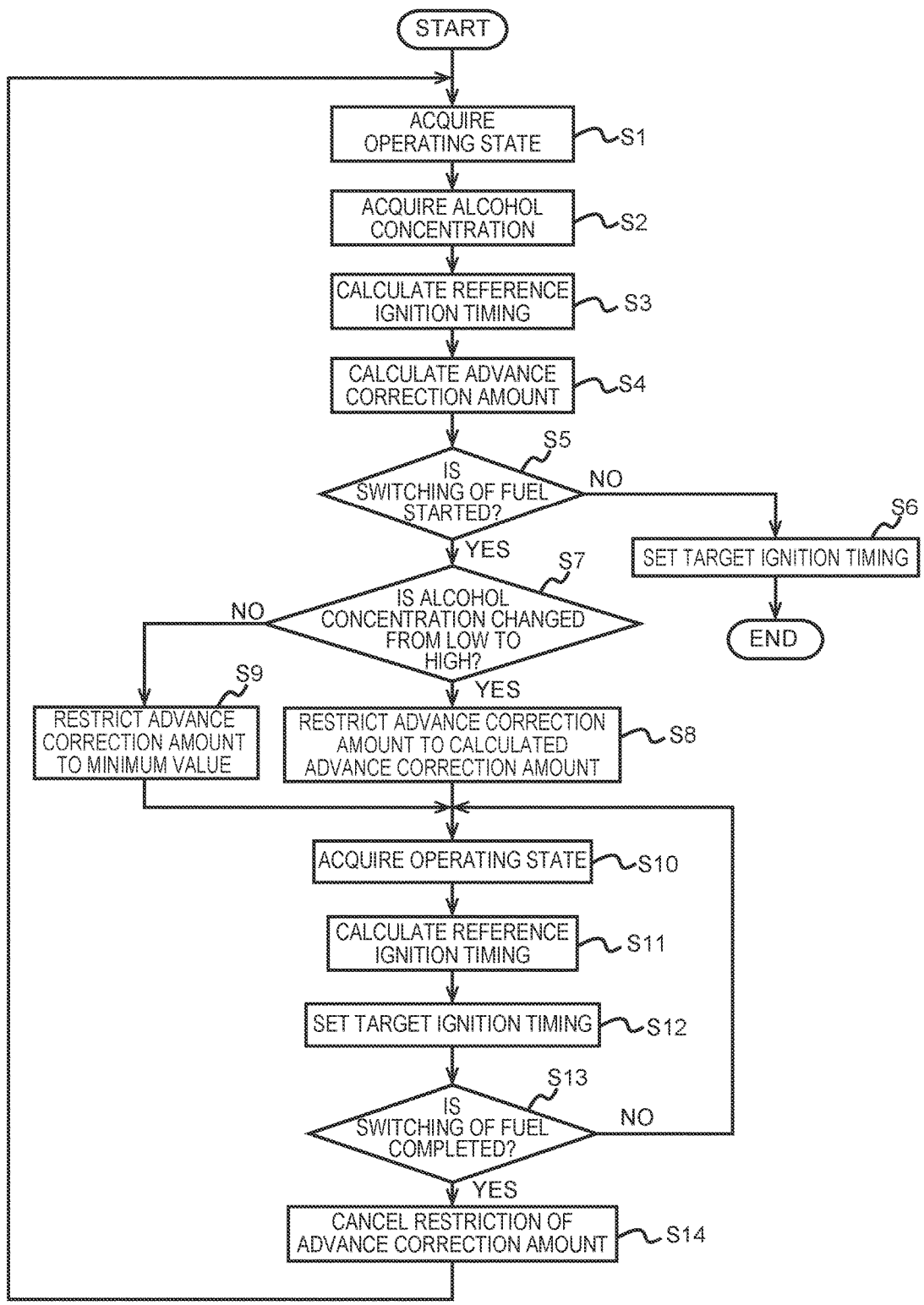
FIG. 3 is a flowchart illustrating one example of ignition timing control executed by an ECU.

Based on the above, the ignition timing control executed by the ECU 40 will be described. FIG. 3 is a flowchart illustrating one example of the ignition timing control executed by the ECU 40. The ECU 40 repeatedly executes the ignition timing control at every predetermined time.

The ECU 40 acquires a load and a speed indicative of the operating state of the engine 10 based on output signals of the air flowmeter 18 and the crank angle sensor 14a (step S1). The processing of step S1 and later-described step S10 is one example of the processing executed by the operating state acquisition unit configured to acquire the operating state of the engine 10.

Next, the ECU 40 acquires the concentration of alcohol in the fuel based on an output signal from the alcohol concentration sensor 24 (step S2). The processing of step S2 is one example of the processing executed by the alcohol concentration acquisition unit configured to acquire the concentration of alcohol in the fuel based on the alcohol concentration sensor 24 provided in the low-pressure pipe 25, which communicates with the low-pressure delivery pipe 26 and the high-pressure delivery pipe 36 configured to supply fuel to the port injection valves 27 and the cylinder injection valves 37 of the engine 10, respectively.

Next, the ECU 40 calculates a reference ignition timing corresponding to the operating state of the acquired engine 10 (step S3), and calculates an advance correction amount corresponding to the acquired alcohol concentration (step S4). The processing of step S3 and later-described step S11 is one example of the processing executed by the reference ignition timing calculation unit configured to calculate the reference ignition timing of the engine 10 based on the operating state. The processing of step S4 is one example of the processing executed by the advance correction amount calculation unit configured to calculate the advance correction amount of the ignition timing such that the advance amount of the ignition timing increases more as the alcohol concentration is higher.

Next, the ECU 40 determines whether or not switching from the first fuel to the second fuel or third fuel that is different in alcohol concentration from the first fuel is started (step S5). Specifically, if a difference between a alcohol concentration acquired by the alcohol concentration sensor 24 this time and an alcohol concentration acquired last time, i.e., a change amount in the alcohol concentration, is equal to or more than a predetermined value, it is determined that switching to the second fuel that is higher in alcohol concentration than the first fuel is started. The predetermined value is prestored in the ROM of the ECU 40. When the determination result is negative, the ECU 40 sets a value obtained by adding the advance correction amount to the calculated reference ignition timing as a target ignition timing (step S6). As a consequence, even when the fuel is not switched, enhanced fuel efficiency is achieved, while the knocking resistance is secured. The processing of step S6 and later-described step S12 is one example of the processing executed by the setting unit configured to set the target ignition timing of the engine 10 based on the reference ignition timing and the advance correction amount.

When positive determination is made in step S5, the ECU 40 determines whether or not the first fuel is switched to the second fuel that is higher in alcohol concentration than the first fuel based on the difference between the alcohol concentration acquired this time and the alcohol concentration acquired last time (step S7). When the alcohol concentration acquired this time is higher than the alcohol concentration acquired last time, the positive determination is made. When the alcohol concentration acquired this time is lower than the alcohol concentration acquired last time, negative determination is made. The processing of steps S5 and S7 is one example of the processing executed by the start determination unit configured to determine whether or not the fuel injected from the port injection valves 27 and the cylinder injection valves 37 starts to switch from the first fuel to the second fuel that is higher in alcohol concentration than the first fuel, based on change in alcohol concentration. When the determination result in step S7 is negative, it means that the first fuel is switched to the third fuel that is lower in alcohol concentration than the first fuel. Accordingly, the processing of step S7 also corresponds to one example of the processing executed by the start determination unit configured to determine, based on change in the alcohol concentration, whether or not the fuel injected from the port injection valves 27 and the cylinder injection valve 37s starts to switch from the first fuel to the third fuel that is lower in alcohol concentration than the first fuel.

When positive determination is made in step S7, that is, when the first fuel is switched to the second fuel that is higher in alcohol concentration than the first fuel, the ECU 40 restricts the advance correction amount to an advance correction amount corresponding to the alcohol concentration of the first fuel calculated in step S4 before the start of switching is determined (step S8). The processing of step S8 is one example of the processing executed by the restriction unit configured to restrict the advance correction amount, during a switching period from the time when the start of switching is determined to the time when the completion of switching is determined, to the advance correction amount corresponding to the alcohol concentration of the first fuel or lower.

When negative determination is made in step S7, i.e., when the first fuel is switched to the third fuel that is lower in alcohol concentration than the first fuel, the ECU 40 restricts the advance correction amount to a minimum value prestored in the ROM of the ECU 40 (step S9). The minimum value is herein an advance correction amount corresponding to the case where the alcohol concentration of fuel is zero. The processing of step S9 is one example of the processing executed by the restriction unit configured to restrict the advance correction amount, during the switching period from the time when the start of switching is determined to the time when the completion of switching is determined, to the advance correction amount corresponding to the case of the alcohol concentration being zero. The reason for such restriction of the advance correction amount will be described later.

Next, the ECU 40 acquires the operating state of the engine 10 (step S10) again, and calculates a reference ignition timing based on the acquired operating state (step S11). The ECU 40 then adds a restricted advance correction amount to the calculated reference ignition timing and sets the obtained value as a target ignition timing (step S12).

Next, the ECU 40 determines whether or not switching to the second fuel or the third fuel is completed (step S13). When the determination result is negative, the processing subsequent to step S10 is repeated again, i.e., the advance correction amount is restricted during the switching period after the start of switching and before the completion of switching. When the determination result is positive in step S13, i.e., the completion of switching is determined, the ECU 40 cancels the aforementioned restriction of the advance correction amount (step S14), and executes the processing subsequent to step S1 again. Accordingly, after the completion of switching, the target ignition timing is calculated based on the advance correction amount corresponding to the alcohol concentration of the second fuel. As a result, it becomes possible to achieve enhanced fuel efficiency while securing the knocking resistance. The processing of step S14 is one example of the processing executed by the cancel unit configured to cancel the restriction of the advance correction amount after it is determined that switching is completed.

Next, a specific description is given of the target ignition timing set in the case where the first fuel is switched to the second fuel that is higher in alcohol concentration than the first fuel. The following description is based on the assumption that the fuel is continuously injected from both the port injection valves 27 and the cylinder injection valves 37.

Figure 4:
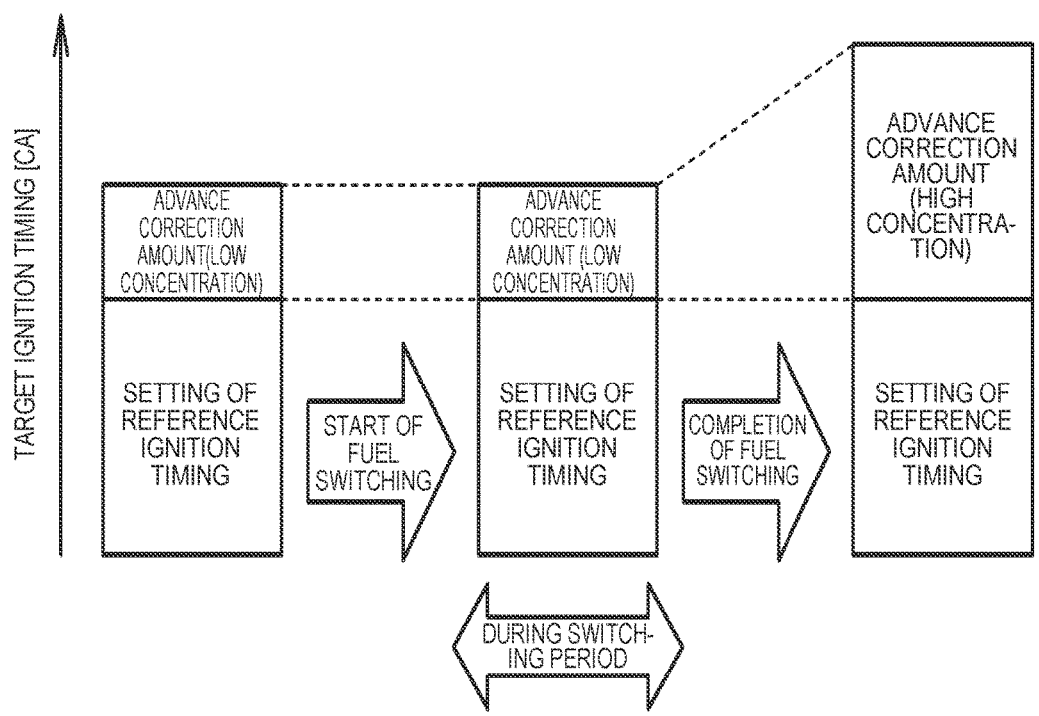
FIG. 4 is a schematic view illustrating change in the target ignition timing in the case where the first fuel is switched to the second fuel that is higher in alcohol concentration than the first fuel.

FIG. 4 is a schematic view illustrating change in the target ignition timing in the case where the first fuel is switched to the second fuel that is higher in alcohol concentration than the first fuel. A vertical axis represents the target ignition timing. The target ignition timing is advanced more as it is higher in the vertical axis. As illustrated in FIG. 4, before the start of switching, the target ignition timing is set based on the advance correction amount corresponding to a low alcohol concentration of the first fuel (steps S1 to S6). During the switching period, the target ignition timing is set with the advance correction amount being restricted to the advance correction amount corresponding to the low alcohol concentration of the first fuel calculated before the start of switching (steps S8, S10 to S12). After the completion of switching, restriction of the advance correction amount is canceled (step S14), and the target ignition timing is calculated based on the advance correction amount corresponding to the high alcohol concentration of the second fuel (steps S1 to S6).

Figure 5:
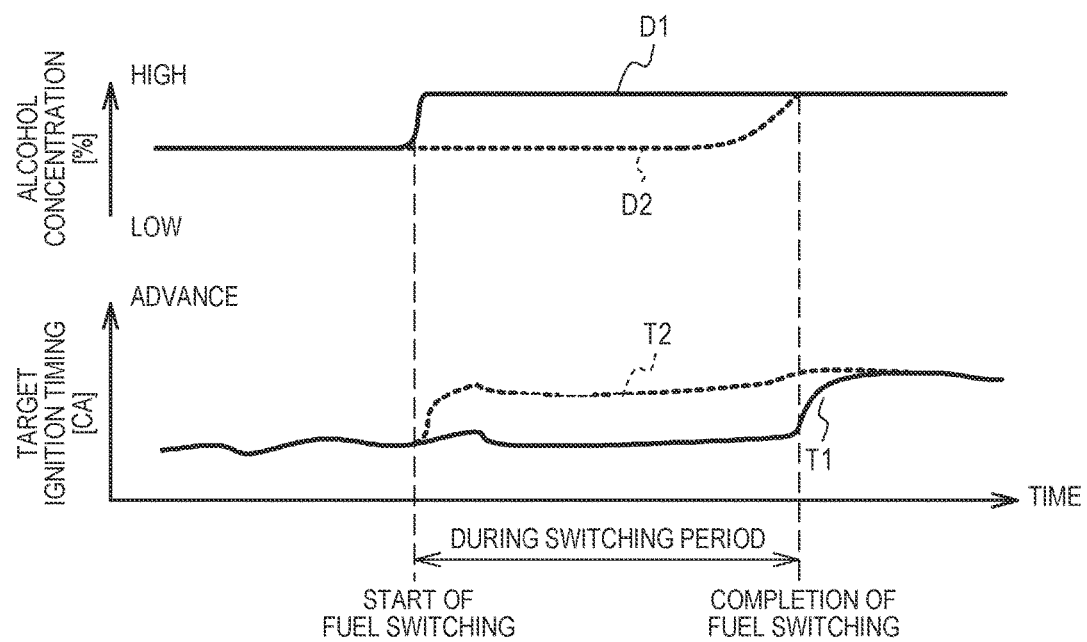
FIG. 5 is a time chart illustrating change in the alcohol concentration and change in the target ignition timing in the case where the first fuel is switched to the second fuel that is higher in alcohol concentration than the first fuel.

FIG. 5 is a time chart illustrating change in the alcohol concentration and change in the target ignition timing in the case where the first fuel is switched to the second fuel that is higher in alcohol concentration than the first fuel. A line segment D1 is a solid line representing the alcohol concentration acquired with the alcohol concentration sensor 24. A line segment D2 is a broken line representing the concentration of alcohol in the fuel in the vicinity of the port injection valves 27, for example. In FIG. 5, the concentration of alcohol in the fuel in the vicinity of the port injection valves 27 is illustrated in contrast to the alcohol concentration acquired with the alcohol concentration sensor 24. The reason why the concentration of alcohol in the fuel not in the vicinity of the cylinder injection valves 37 but in the vicinity of the port injection valves 27 is illustrated is as shown below. When fuel injection is performed from both the port injection valves 27 and the cylinder injection valves 37, the fuel injection amount of the port injection valves 27 is generally smaller. Accordingly, even in consideration of a difference between the content volume β in the section BC and the content volume γ in the section BD, it can be determined that the first fuel is already completely consumed by the cylinder injection valve 37 in the section BD and therefore switching is completed at the time when the concentration of alcohol in the fuel in the vicinity of the port injection valves 27 becomes equal to the high alcohol concentration of the second fuel.

While the high alcohol concentration of the second fuel is immediately detected as indicated by the line segment D1, the concentration of alcohol in the fuel in the vicinity of the port injection valves 27 gradually goes up during the switching period as indicated by the line segment D2. This is because during the switching period, the second fuel is consumed by the port injection valves 27 while part of the second fuel is mixed into the first fuel in the vicinity of the port injection valves 27.

The line segment T1 is a solid line representing a target ignition timing controlled in this embodiment. The line segment T1 represents change in the target ignition timing in the case where the advance correction amount during the switching period is restricted to the advance correction amount corresponding to the low alcohol concentration of the first fuel as described in the foregoing. The line segment T2 represents change in the target ignition timing in which the advance correction amount is calculated based on the high alcohol concentration of the second fuel acquired with the alcohol concentration sensor 24 without the above-stated restriction of the advance correction amount. The reason why the line segments T1, T2 slightly fluctuate over the entire time line is not because the advance correction amount fluctuates but because the reference ignition timing fluctuates based on change in the operating state of the engine 10, which results in fluctuation of the target ignition timing.

As indicated by the line segment T2, the advance correction amount corresponding to the high alcohol concentration of the second fuel is calculated immediately after the start of switching, and the target ignition timing is set with the calculated advance correction amount. However, during the switching period, the first fuel remains in such places as the low-pressure pipe 25. Accordingly, since the target ignition timing is set to a more advance side than the target ignition timing corresponding to the low alcohol concentration of the first fuel actually injected from the port injection valve 27 as indicated by the line segment T2, the knocking resistance may be deteriorated.

Contrary to this, as indicated by the line segment T1 or in FIG. 4, the advance correction amount during the switching period is restricted to the advance correction amount corresponding to the low alcohol concentration of the first fuel before the start of switching. As a result, the deterioration of the knocking resistance as described before is suppressed. After the completion of switching, the advance correction amount corresponding to the high alcohol concentration of the second fuel to be actually injected is calculated, and the target ignition timing is set based thereon. This makes it possible to achieve enhanced fuel efficiency while securing knocking resistance.

Figure 6:
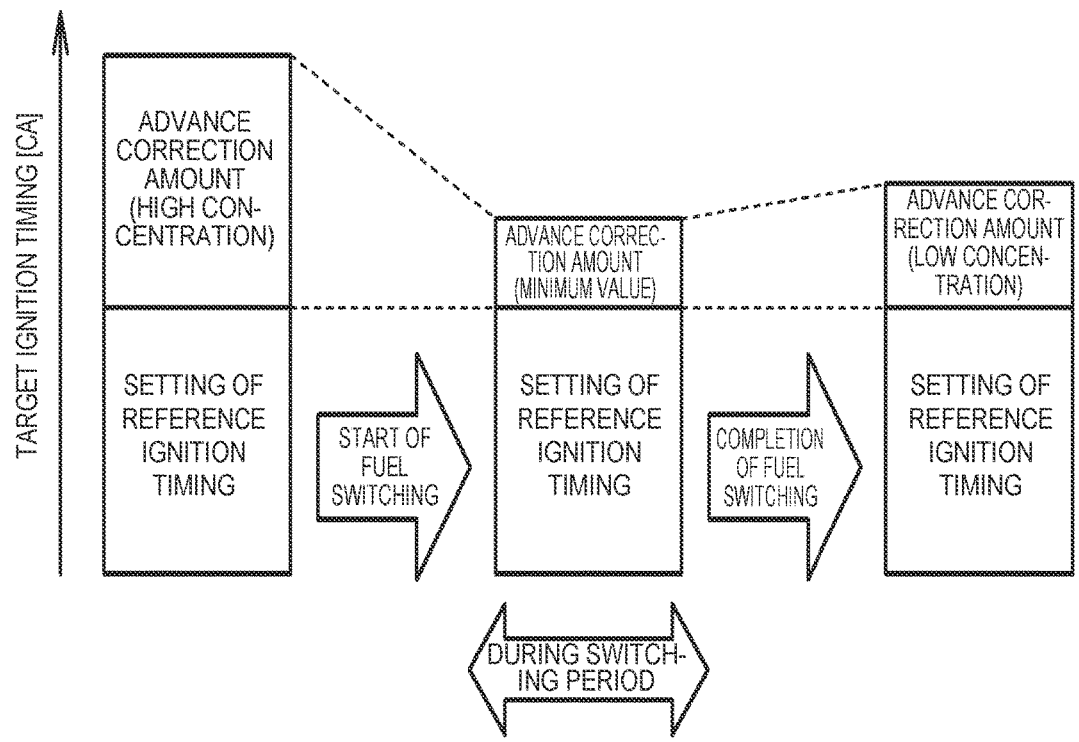
FIG. 6 is a schematic view illustrating the target ignition timing in the case where the first fuel is switched to the third fuel that is lower in alcohol concentration than the first fuel.

Next, a specific description is given of the target ignition timing set in the case where the first fuel is switched to the third fuel that is lower in alcohol concentration than the first fuel. FIG. 6 is a schematic view illustrating the target ignition timing in the case where the first fuel is switched to the third fuel that is lower in alcohol concentration than the first fuel. As illustrated in FIG. 6, before the start of switching, the target ignition timing is set based on the advance correction amount corresponding to the high alcohol concentration of the first fuel (steps S1 to S6). During the switching period, the advance correction amount is restricted to a minimum value, with which the target ignition timing is set (steps S9 to S12). After the completion of switching, restriction of the advance correction amount is canceled (step S14), and the target ignition timing is calculated based on the advance correction amount corresponding to the low alcohol concentration of the third fuel (steps S1 to S6).

Figure 7:
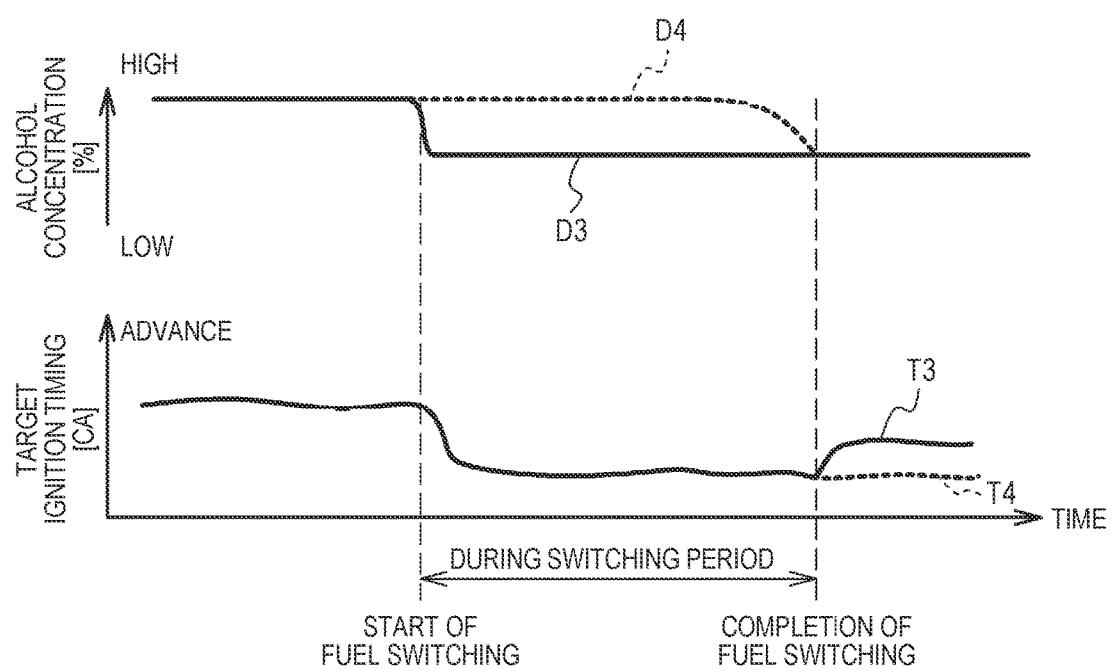
FIG. 7 is a time chart illustrating change in the alcohol concentration and the target ignition timing in the case where the first fuel high in alcohol concentration is switched to the third fuel that is lower in alcohol concentration than the first fuel.

FIG. 7 is a time chart illustrating change in the alcohol concentration and in the target ignition timing in the case where the first fuel is switched to the third fuel that is lower in alcohol concentration than the first fuel. A line segment D3 is a solid line representing the alcohol concentration acquired with the alcohol concentration sensor 24. A line segment D4 is a broken line representing the concentration of alcohol in the fuel in the vicinity of the port injection valves 27, for example. Because of the same reason as in the case of the line segments D1, D2, the line segment D3 indicates that the alcohol concentration in the low-concentration fuel is immediately detected, while the line segment D4 indicates that the alcohol concentration gradually goes down during the switching period.

A line segment T3 is a solid line representing a target ignition timing controlled in this embodiment. The line segment T3 represents change in the target ignition timing in the case where the advance correction amount during the switching period is restricted to a minimum value and after the completion of switching, an advance correction amount corresponding to the low alcohol concentration of the third fuel is calculated. A line segment T4 represents change in the target ignition timing in the case where the advance correction amount during the switching period is restricted to a minimum value, and even after the completion of switching, the advance correction amount is still restricted to the minimum value within a prescribed period.

As indicated by the line segment T3, during the switching period, the advance correction amount is restricted to a minimum value. The reason thereof is as shown below. For example, during the switching period, the advance correction amount may be restricted to the advance correction amount corresponding to the low alcohol concentration of the third fuel acquired with the alcohol concentration sensor 24. However, when the first fuel is switched to the third fuel that is lower in alcohol concentration than the first fuel, the first fuel and the third fuel may be mixed in the vicinity of the alcohol concentration sensor 24 due to such factors as vibration from the engine 10 or from a road surface, and an angle of gradient of the road surface. As a consequence, the alcohol concentration acquired with the alcohol concentration sensor 24 may become higher than the low alcohol concentration of the third fuel. Also in this case, the third fuel may be mixed with the first fuel in the low-pressure delivery pipe 26 and the high-pressure delivery pipe 36, so that the alcohol concentration of the fuel in the low-pressure delivery pipe 26 and the high-pressure delivery pipe 36 may become lower than the alcohol concentration acquired with the alcohol concentration sensor 24. Accordingly, when the target ignition timing is set based on the advance correction amount corresponding to the alcohol concentration higher than an actual low alcohol concentration of the third fuel, the injected fuel has an alcohol concentration lower than the alcohol concentration acquired with the alcohol concentration sensor 24, which may cause deterioration in the knocking resistance. Accordingly, in the present embodiment, the knocking resistance is secured by restricting the advance correction amount to a minimum value during the switching period in the case where the first fuel is switched to the third fuel that is lower in alcohol concentration than the first fuel.

When the advance correction amount is restricted to a minimum value even after the completion of switching as indicated by the line segment T4, it becomes impossible to set the target ignition timing based on the advance correction amount corresponding to the alcohol concentration of the fuel after the completion of switching. As a result, enhanced fuel efficiency cannot be achieved. On the contrary, when the target ignition timing is set based on the advance correction amount corresponding to the low alcohol concentration of the third fuel acquired with the alcohol concentration sensor 24 after the completion of switching as indicated by the line segment T3 and in FIG. 6, enhanced fuel efficiency is achieved in the range where knocking does not occur.

Although the embodiments of the present disclosure have been described in detail, the present disclosure is not limited to such specific embodiments. Various modifications and changes may be made without departing from the scope of the present disclosure.

In the embodiment described in the foregoing, the engine 10 includes both the port injection valves 27 and the cylinder injection valves 37. However, the present disclosure is not limited thereto. For example, in the case of an engine including only the port injection valves 27, the completion of switching is determined when an integrated value of the fuel injection amount of the port injection valves 27 after the start of switching is determined becomes equal to or more than the content volumes α, β of the sections AB, BC. This also applies to the case of an engine including only the cylinder injection valves 37. In this case, the completion of switching is determined when an integrated value of the fuel injection amount of the cylinder injection valves 37 after the start of switching is determined becomes equal to or more than the content volumes α, γ of the sections AB, BD.

In the above embodiments, when an integrated value of the fuel injection amounts during the switching period becomes equal to or more than the content volume in a specified section, it is determined that the first fuel is consumed in that section. However, depending on the vibration applied to the engine system 1 or the angle of gradient of a road surface, the first fuel and the second fuel or the third fuel may be mixed in a specified section during the switching period. Consequently, when the integrated value of the fuel injection amounts becomes equal to the content volume in a specified section, there is a possibility that the first fuel remains in that section. Accordingly, when the integrated value of the fuel injection amounts becomes, for example, equal to or more than a value obtained by adding a specified margin to the content volume of the specified section, it may be determined that the first fuel is consumed in that section.

In the above embodiments, whether or not the first fuel remaining in a specified section is consumed is determined based on whether or not the integrated value of the fuel injection amounts becomes equal to or more than the content volume of the specified section. However, the present disclosure is not limited thereto. For example, a value may be obtained by subtracting one value, out of an integrated value of the fuel injection amounts and a content volume of a specified section, from the other value. When the obtained value is equal to zero or included in a specified range including zero, it may be determined that the first fuel is consumed. Moreover, a value may be obtained by multiplying one value, out of the integrated value and the content volume, by the other value. When the obtained value is equal to 1 or included in a specified range including 1, it may be determined that the first fuel is consumed. In these cases, a value obtained by adding a specified margin to an actual content volume may be used as the content volume for the determination.

Although the alcohol concentration sensor 24 is disposed in the low-pressure pipe 25 in the above embodiment disclosed, the alcohol concentration sensor 24 may be provided in the fuel tank 21. In that case, the sensor point A positions at a base end of the low-pressure pipe 25 inserted into the fuel tank 21, and the content volume α is the content volume of a section extending from the branch point B of the low-pressure pipe 25 to an upstream base end.

As illustrated in FIG. 4, the advance correction amount, during the period of switching from the first fuel with a low alcohol concentration to the second fuel with a high alcohol concentration, is restricted to the advance correction amount corresponding to the alcohol concentration of the first fuel. However, the advance correction amount during the period of switching may be restricted to lower values. From a viewpoint of enhancement in fuel efficiency, it is desirable to restrict the advance correction amount during the switching period to the advance correction amount corresponding to the alcohol concentration of the first fuel. However, in consideration of error of the alcohol concentration sensor during the switching period or the like, the advance correction amount during the switching period may be set equal to or less than the advance correction amount corresponding to the alcohol concentration of the first fuel so as to secure the knocking resistance.

In the embodiment described in the foregoing, the start of switching is determined when the change amount in the alcohol concentration acquired with the alcohol concentration sensor 24 is equal to or more than a predetermined value. However, the present disclosure is not limited thereto. For example, when a sender gauge provided in the fuel tank 21 indicates increase in the fuel amount in the fuel tank 21, execution of refueling may be determined. When the change amount in the alcohol concentration acquired with the alcohol concentration sensor 24 within a prescribed period after the refueling becomes equal to or more than a predetermined value, the start of switching may be determined. This makes it possible to suppress erroneous determination of the start of switching.

The present embodiment may also be defined as follows: an ignition timing control device for an internal combustion engine configured to use a fuel containing alcohol, the internal combustion engine including: a fuel injection valve; a delivery pipe configured to supply the fuel to the fuel injection valve; a fuel pipe configured to communicate with the delivery pipe; a fuel tank; and an alcohol concentration sensor provided to one of the fuel pipe and the fuel tank, the alcohol concentration sensor being configured to detect a concentration of alcohol in the fuel, the ignition timing control device including an electronic control unit configured to: acquire an operating state of the internal combustion engine; acquire the concentration of alcohol in the fuel based on the alcohol concentration detected with the alcohol concentration sensor; calculate a reference ignition timing of the internal combustion engine based on the operating state; calculate an advance correction amount of an ignition timing such that an advance amount of the ignition timing increases more as the alcohol concentration is higher; set a target ignition timing of the internal combustion engine based on the reference ignition timing and the advance correction amount; determine, based on change in the alcohol concentration, whether or not the fuel injected from the fuel injection valve starts to switch from a first fuel to a second fuel higher in the alcohol concentration than the first fuel; determine whether or not the first fuel remaining in the fuel pipe and the delivery pipe is consumed and switching from the first fuel to the second fuel is completed; restrict the advance correction amount, during a period from a time when the start of the switching is determined to a time when the completion of the switching is determined, to an advance correction amount corresponding to the alcohol concentration of the first fuel or lower; and cancel restriction of the advance correction amount after the completion of the switching is determined. The electronic control unit may be configured to determine whether or not switching from the first fuel to the second fuel is completed based on i) a content volume of a portion of the fuel pipe positioned downstream from the alcohol concentration sensor and the delivery pipe and ii) an integrated value of the fuel injection amount of the fuel injection valve after the start of switching is determined.

The present embodiment may also be defined as follows: an ignition timing control device for an internal combustion engine configured to use a fuel containing alcohol, the internal combustion engine including: a fuel injection valve; a delivery pipe configured to supply the fuel to the fuel injection valve; a fuel pipe configured to communicate with the delivery pipe; a fuel tank; and an alcohol concentration sensor provided to one of the fuel pipe and the fuel tank, the alcohol concentration sensor being configured to detect a concentration of alcohol in the fuel, and the ignition timing control device including an electronic control unit configured to: acquire an operating state of the internal combustion engine; acquire the concentration of alcohol in the fuel based on the alcohol concentration detected with the alcohol concentration sensor; calculate a reference ignition timing of the internal combustion engine based on the operating state; calculate an advance correction amount of an ignition timing such that an advance amount of the ignition timing increases more as the alcohol concentration is higher; set a target ignition timing of the internal combustion engine based on the reference ignition timing and the advance correction amount; determine, based on change in the alcohol concentration, whether or not the fuel injected from the fuel injection valve starts to switch from a first fuel to a third fuel that is lower in the alcohol concentration than the first fuel; determine whether or not the first fuel remaining in the fuel pipe and the delivery pipe is consumed and switching from the first fuel to the third fuel is completed; restrict the advance correction amount, during a period from a time when the start of the switching is determined to a time when the completion of the switching is determined, to an advance correction amount in a case of the alcohol concentration being zero; and cancel restriction of the advance correction amount after the completion of switching is determined. The electronic control unit may be configured to determine whether or not switching from the first fuel to the third fuel is completed based on i) a content volume of a portion of the fuel pipe positioned downstream from the alcohol concentration sensor and the delivery pipe and ii) an integrated value of the fuel injection amount of the fuel injection valve after the start of switching is determined.

What is claimed is:

1. An ignition timing control device for an internal combustion engine configured to use a fuel containing alcohol, the internal combustion engine including
   a fuel injection valve,
   a delivery pipe configured to supply the fuel to the fuel injection valve,
   a fuel pipe configured to communicate with the delivery pipe,
   a fuel tank, and
   an alcohol concentration sensor provided to one of the fuel pipe and the fuel tank, the alcohol concentration sensor being configured to detect a concentration of alcohol in the fuel,
   the ignition timing control device comprising
   an electronic control unit configured to:
   acquire an operating state of the internal combustion engine;
   acquire the concentration of alcohol in the fuel based on the alcohol concentration detected with the alcohol concentration sensor;
   calculate a reference ignition timing of the internal combustion engine based on the operating state;
   calculate an advance correction amount of an ignition timing such that an advance amount of the ignition timing increases more as the alcohol concentration is higher;
   set a target ignition timing of the internal combustion engine based on the reference ignition timing and the advance correction amount;
   determine, based on change in the alcohol concentration, whether or not the fuel injected from the fuel injection valve starts to switch from a first fuel to a second fuel higher in the alcohol concentration than the first fuel;
   determine whether or not the first fuel remaining in the fuel pipe and the delivery pipe is consumed and switching from the first fuel to the second fuel is completed;
   restrict the advance correction amount, during a period from a time when the start of the switching is determined to a time when the completion of the switching is determined, to an advance correction amount corresponding to the alcohol concentration of the first fuel or lower; and
   cancel restriction of the advance correction amount after the completion of the switching is determined.

2. The ignition timing control device according to claim 1, wherein
   the electronic control unit is configured to determine whether or not switching from the first fuel to the second fuel is completed based on i) a content volume of a portion of the fuel pipe positioned downstream from the alcohol concentration sensor and the delivery pipe and ii) an integrated value of a fuel injection amount of the fuel injection valve after the start of the switching is determined.

3. An ignition timing control device for an internal combustion engine configured to use a fuel containing alcohol, the internal combustion engine including
   a fuel injection valve,
   a delivery pipe configured to supply the fuel to the fuel injection valve,
   a fuel pipe configured to communicate with the delivery pipe,
   a fuel tank, and
   an alcohol concentration sensor provided to one of the fuel pipe and the fuel tank, the alcohol concentration sensor being configured to detect a concentration of alcohol in the fuel,
   the ignition timing control device comprising
   an electronic control unit configured to:
   acquire an operating state of the internal combustion engine;
   acquire the concentration of alcohol in the fuel based on the alcohol concentration detected with the alcohol concentration sensor;
   calculate a reference ignition timing of the internal combustion engine based on the operating state;
   calculate an advance correction amount of an ignition timing such that an advance amount of the ignition timing increases more as the alcohol concentration is higher;
   set a target ignition timing of the internal combustion engine based on the reference ignition timing and the advance correction amount;
   determine, based on change in the alcohol concentration, whether or not the fuel injected from the fuel injection valve starts to switch from a first fuel to a third fuel that is lower in the alcohol concentration than the first fuel;
   determine whether or not the first fuel remaining in the fuel pipe and the delivery pipe is consumed and switching from the first fuel to the third fuel is completed;
   restrict the advance correction amount, during a period from a time when the start of the switching is determined to a time when the completion of the switching is determined, to an advance correction amount in a case of the alcohol concentration being zero; and
   cancel restriction of the advance correction amount after the completion of the switching is determined.

4. The ignition timing control device according to claim 3, wherein
   the electronic control unit is configured to determine whether or not switching from the first fuel to the third fuel is completed based on i) a content volume of a portion of the fuel pipe positioned downstream from the alcohol concentration sensor and the delivery pipe and ii) an integrated value of a fuel injection amount of the fuel injection valve after the start of the switching is determined.

* * * * *